(12) United States Patent
Symkens et al.

(10) Patent No.: US 9,033,486 B2
(45) Date of Patent: May 19, 2015

(54) METHOD FOR PRODUCING A DECORATIVE FILM, AS WELL AS A DECORATIVE PANEL

(71) Applicant: 03;TRESPA INTERNATIONAL B.V., Weert (NL)

(72) Inventors: Stefan Henri Dominique Maria Symkens, Genk (BE); Henricus Hubertus Maria Kömhoff, Stramproy (NL); Marcelle Hodgson, Maarheeze (NL); Irma Vogels-Jansen, Budel (NL)

(73) Assignee: TRESPA INTERNATIONAL B.V., Weert (NL)

( * ) Notice: Subject to any disclaimer, the term of this patent is extended or adjusted under 35 U.S.C. 154(b) by 43 days.

(21) Appl. No.: 13/629,452

(22) Filed: Sep. 27, 2012

(65) Prior Publication Data

US 2013/0078437 A1  Mar. 28, 2013

(30) Foreign Application Priority Data

Sep. 28, 2011  (NL) .................................. 2007494

(51) Int. Cl.
| | | |
|---|---|---|
| *B41J 2/01* | (2006.01) | |
| *B44C 1/00* | (2006.01) | |
| *B32B 38/00* | (2006.01) | |
| *B41J 11/00* | (2006.01) | |
| *B44C 1/10* | (2006.01) | |
| *B44C 5/04* | (2006.01) | |
| *D21H 25/06* | (2006.01) | |
| *D21H 27/18* | (2006.01) | |
| *D21H 27/26* | (2006.01) | |
| *D21H 27/30* | (2006.01) | |
| *D21H 17/47* | (2006.01) | |
| *D21H 17/48* | (2006.01) | |
| *D21H 17/51* | (2006.01) | |
| *D21H 19/38* | (2006.01) | |
| *D21H 19/48* | (2006.01) | |
| *B41J 2/21* | (2006.01) | |

(52) U.S. Cl.
CPC .................. *B44C 1/00* (2013.01); *B32B 38/145* (2013.01); *Y10T 428/24868* (2015.01); *B41J 2/2107* (2013.01); *B41J 11/0015* (2013.01); *B41J 11/002* (2013.01); *B44C 1/10* (2013.01); *B44C 5/0469* (2013.01); *D21H 25/06* (2013.01); *D21H 27/18* (2013.01); *D21H 27/26* (2013.01); *D21H 27/30* (2013.01); *D21H 17/47* (2013.01); *D21H 17/48* (2013.01); *D21H 17/51* (2013.01); *D21H 19/38* (2013.01); *D21H 19/48* (2013.01)

(58) Field of Classification Search
CPC ............ B41J 2/01; B41J 2/211; B41J 2/1433; B41J 2/17; B41J 2/17593; B41J 2/2107; B41J 2/1755; B41J 2/2114; B41J 11/0015; B41J 2/2056; B41J 2/21; C09D 11/36; C09D 11/40; C09D 11/30; C09D 11/38; C09D 11/322; C09D 11/328; C09D 11/101; C09D 11/005; C09D 11/54; C09D 11/52; B41M 5/0011; B41M 5/0017; B41M 7/00
USPC ........... 347/100, 95, 96, 102, 105, 88, 99, 20, 347/21, 9; 428/195, 32.1; 106/31.6, 31.27
See application file for complete search history.

(56) References Cited

U.S. PATENT DOCUMENTS

| | | |
|---|---|---|
| 3,789,604 A | 2/1974 | Hurt |
| 4,151,315 A | 4/1979 | Fock et al. |
| 4,246,315 A | 1/1981 | Kopp et al. |
| 4,324,832 A | 4/1982 | Moroff et al. |
| 4,501,635 A | 2/1985 | Siry et al. |
| 4,579,776 A | 4/1986 | Fock et al. |
| 4,801,486 A | 1/1989 | Quacquarella et al. |
| 4,801,495 A | 1/1989 | van der Hoeven |
| 4,927,572 A | 5/1990 | van der Hoeven |
| 7,192,543 B2 | 3/2007 | Malfliet et al. |
| 2008/0151034 A1* | 6/2008 | Mohri et al. ................... 347/213 |
| 2010/0282407 A1* | 11/2010 | van der Zwan et al. ... 428/32.21 |
| 2011/0159208 A1 | 6/2011 | Price |
| 2011/0242200 A1* | 10/2011 | Tojo et al. ......................... 347/21 |
| 2011/0244200 A1* | 10/2011 | Van De Wall et al. ........ 428/201 |
| 2011/0249055 A1* | 10/2011 | Sasada et al. .................... 347/20 |
| 2011/0304661 A1* | 12/2011 | Emamjomeh et al. ............ 347/1 |
| 2012/0114918 A1 | 5/2012 | Voncken |

FOREIGN PATENT DOCUMENTS

| | | |
|---|---|---|
| DE | 2224732 A1 | 12/1973 |
| DE | 2727312 | 12/1978 |
| DE | 2801396 | 7/1979 |
| DE | 2903172 A1 | 8/1980 |
| DE | 3024394 | 1/1982 |
| DE | 3329679 | 1/1985 |
| DE | 217252 A2 | 4/1987 |
| DE | 3541187 C1 | 6/1987 |
| DE | 3630315 | 3/1988 |
| DE | 4413619 A1 | 6/1995 |
| DE | 10249223 A1 | 5/2004 |
| DE | 102008008292 A1 | 8/2009 |
| EP | 0022153 A1 | 1/1981 |
| EP | 1923211 | 5/2008 |
| FR | 2821014 A1 | 8/2002 |
| GB | 1314329 | 4/1973 |
| NL | 7015324 | 4/1971 |
| WO | 2008134823 A1 | 11/2008 |
| WO | 2010064895 A2 | 6/2010 |
| WO | 2010104380 A1 | 9/2010 |
| WO | 2011110381 A2 | 9/2011 |

* cited by examiner

*Primary Examiner* — Manish S Shah
(74) *Attorney, Agent, or Firm* — Roberts & Roberts, LLP

(57) ABSTRACT

The present invention relates to a method for producing a decorative film having a resin-impregnated substrate paper provided with one or more top layers, which method includes the following steps: i) providing a resin-impregnated substrate paper, ii) printing the substrate paper obtained in step i) with an ink composition, using inkjet technology, iii) subjecting the substrate paper printed with an ink composition as obtained after step ii) to a treatment of the drying and/or curing type, iv) applying at least one transparent top layer to the paper obtained after step iii), and v) curing the paper obtained after step iv) to obtain the decorative film.

22 Claims, No Drawings

METHOD FOR PRODUCING A DECORATIVE FILM, AS WELL AS A DECORATIVE PANEL

The present invention relates to a method for producing a decorative film. The present invention further relates to a decorative panel, comprising a carrier, a decorative film applied to said carrier and possibly a transparent layer overlying the decorative film.

Decorative foil, also referred to as decorative film, is used for decorating plate materials, said plate materials mainly being based on resin-impregnated wood fibres. Such a decorative panel is known from U.S. Pat. No. 3,789,604 and U.S. Pat. No. 4,801,495 in the name of the present applicant. Said decorative foils known from the aforesaid U.S. patents are given a structured surface through the use of a polyester or polypropylene film. Furthermore, such decorative foils are passed between two rollers, during which passage the structure present on the roller surface is transferred to the decorative foil, which means that a repetitive pattern corresponding to the pattern that is present on the outer surface of the roller(s) will form on the decorative foil.

From U.S. Pat. Nos. 4,801,495 and 4,927,572 in the name of the present applicant there is known a decorative panel in which a resin-impregnated decorative paper is used, which panel is characterised by a scratch resistance of at least 1.5 Newton and a resistance against weather influences that complies with ASTM G53-84.

From German Offenlegungsschrift DE 44 13 619 there is known a method for producing a decorative foil wherein a decorative paper is impregnated with a water-dilutable and an electron radiation-curable acrylate in the form of a dispersion, an emulsion or a solution, followed by thermal drying and varnishing, after which curing by means of electron radiation takes place.

From Dutch laid-open document No. 7015324 there is known a method for curing a curable synthetic resin material wherein an unsaturated groups-containing polymer is used as a top layer, which top layer is irradiated with an electronic beam having an energy of 25-300 kV. Suitable polymers mentioned therein include unsaturated polyesters, which are mixed with unsaturated liquid monomers, such as styrene, acrylates or methacrylates.

German Offenlegungsschrift DE 28 01 396 discloses a method for impregnating a carrier material with a thermally cross-linkable resin, whereupon a heat treatment is carried out, after which a radiation-curable resin, in particular an acrylate resin, is applied to the surface thus obtained.

From U.S. Pat. No. 4,501,635 there is known a method wherein a decorative paper is impregnated on the basis of a ureum formaldehyde resin and acryl dispersion, after which a heat treatment is carried out and subsequently a urethane/acrylate-based resin is applied, which resin is cured by using electron radiation.

Producing a decorative paper through impregnation with a resin, followed by a thermal treatment, is a process that is known per se, for example from European patent application EP 0 022 153 and German Patentschrift DE 217 252, in which latter Patentschrift it is explicitly indicated that a decorative paper thus impregnated may additionally be provided with a coat of varnish. With regard to resin impregnation of a decorative paper the following documents may be cited: German Offenlegungsschrift Nos. 2 727 312, 2 903 172, 2 224 732, 3 630 315, 3 541 187, 3 329 679 and 3 024 394, European patent publication EP 1 923 211 as well as U.S. Pat. No. 7,192,543.

From the German Offenlegungsschrift 10 2008 008 292 A1 there is known a method for producing a decorative foil wherein a non-resinated paper layer is provided with a colouring mass, in particular fine-grained colouring particles in the nanometer range of the titanium dioxide, barium sulphate and silicate type, wherein, after the application thereof, open interspaces or voids are present in the fibrous structure of the surface of the paper layer. After the application of the aforesaid colouring mass, a so-called pressure layer is applied, whereupon a resin treatment step, using a melamine resin, is carried out, followed by the application of a transparent protective layer and finally pressing together with a carrier layer in a pressure device. According to said document it is also possible to use a partially resinated paper in a first step, wherein only the underside of the paper layer may be resinated so as not to interfere with the intended fibrous structure at the upper side of the paper layer, so that the resin may extend over at most 30% of the thickness of the paper layer. This German Offenlegungsschrift clearly dictates that resin may not be present at the surface of the paper on which surface the colouring mass is to be applied.

International application WO 2010/064895 in the name of the present applicant relates to a method for producing a decorative foil, wherein the following steps are carried out: providing a substrate, applying an intermediate layer to the substrate, applying a decorative layer to the intermediate layer, using an inkjet, applying a protective layer, after which curing of the assembly takes place. The intermediate layer is applied to the entire surface of the substrate and comprises a composition of aliphatic urethane groups such that the inkjet-applied decorative layer that is present on the intermediate layer cannot penetrate into the substrate.

International application WO 2010/0104380 relates to a method for producing a resin-impregnated decorative paper, which method comprises the steps of providing a paper, impregnating said paper with a resin, drying, re-applying a resin and, finally, curing the paper thus obtained so as to provide a resin-impregnated decorative paper.

An essential step used in the aforesaid International application is the carrying out of a drying treatment so as to make it possible to apply a resin to the dried paper.

The present inventors have found that decorative films produced for outdoor or exterior use, with the decorative films comprising pigments, exhibit insufficient adhesion, in particular between the layers present in such a film. It has in particular been found that the conditions in the outside air are such that the ink compositions used in the decorative films lose their colour with the passage of time, which is found to be undesirable in practice. To obtain sufficient resistance against weather influences of decorative films, it is in some cases attempted to use special pigments, in which regard it should be noted, however, that the use of such pigments requires the preparation of special ink compositions, which are rather expensive, which is disadvantageous from a commercial point of view.

The object of the present invention is thus to provide a method for producing a decorative film wherein a decorative film built up of various layers is obtained, which layers will exhibit a lasting mutual bond.

Another object of the present invention is to provide a method for producing a decorative film, starting from a resin-impregnated substrate paper, which can be provided with high-colour images, with the colour of the images thus provided being retained for a prolonged period of time.

Another object of the present invention is to provide a method for producing a decorative film, wherein the provision of images can take place after the substrate paper that forms the basis has been provided with a resin in advance.

Yet another object of the present invention is to provide a method for producing a decorative film, wherein interim drying treatments are not needed.

The method as described in the introduction is characterised in that the method comprises the following steps:

i) providing a resin-impregnated substrate paper, ii) printing the substrate paper obtained in step i) with an ink composition, using inkjet technology, iii) subjecting the substrate paper printed with an ink composition as obtained after step ii) to a treatment of the drying and/or curing type, iv) applying at least one transparent top layer to the paper obtained after step iii), and v) curing the paper obtained after step iv) to obtain the decorative film.

Using the above steps i)-v) it has been found to be possible to achieve one or more of the aforesaid objects. The present inventors have surprisingly found that step ii) can be carried out directly on the resin-impregnated substrate paper, without there being a need to apply a so-called primer or intermediate layer between the ink layer applied in step ii) and the resin-impregnated substrate paper of step i). Leaving out the aforesaid primer or intermediate layer has advantages not only for process reasons, but it also has an influence on the adhesion of the individual layers in the decorative film obtained after step v). The treatment according to step iii) comprises the curing or drying of essentially only the ink, depending on the composition thereof. Step iii) functions to allow the liquid ink composition to pass into a non-liquid state, with the reactive groups present in the resinated substrate paper remaining substantially unchanged. Said presence of reactive groups is desirable from the viewpoint of the intended lasting bond between the individual layers present in the decorative film.

In a special embodiment, step i) preferably comprises the provision of substrate paper and the impregnation thereof with a resin, wherein the impregnation degree of the resin-impregnated substrate paper used in step i) is 15-100%, based on the dry weight of the substrate paper being used as the base, with the resin being present in the substrate paper comprises reactive groups. The resin thus present extends over the entire thickness of the substrate paper. It is in particular preferable if the impregnation degree of the resin-impregnated substrate paper used in step i) is 30-60%, based on the dry weight of the substrate paper being used as the base, with the resin being present in the substrate paper comprises reactive groups. The resin thus present extends over the entire thickness of the substrate paper. Under the term "entire thickness" is to be understood a situation in which the resin is not only present in the centre or middle of the substrate paper but on the outer surfaces as well, i.e. the upper side and the under side of the substrate paper.

It should be noted that the resonating of substrate paper, i.e. the treatment with resin, in the present invention takes place in such a manner that the substrate paper is provided with resin over the entire thickness thereof. The substrate paper is thus provided with resin components both on the underside and on the upper side. Said impregnation is desirable in order to obtain a decorative film that exhibits uniform properties.

The present inventors have thus found that the impregnation degree of the resin-impregnated substrate paper must preferably lie within a special range so as to thus provide optimum conditions for carrying out step ii), viz. printing the thus impregnated substrate paper with an ink composition, using inkjet technology.

The present inventors have in particular found that a thus preferred impregnation degree contributes to an adequate adhesion of the ink composition to the resin-impregnated substrate paper, wherein the ink composition can slightly penetrate into the resin-impregnated substrate paper so as to effect an adequate anchoring between the ink composition and the substrate paper. The present inventors in particular assume that the penetration of the ink composition into the resin-impregnated substrate paper takes place in such a manner that the resolution of the ink composition thus applied by means of inkjet technology will be retained. If the impregnation degree is lower than the aforesaid lower limit, for example, the resistance of the decorative film eventually obtained will be unsatisfactory, in particular in the case of outdoor use, whilst also the printing result will worsen or be unsatisfactory. If, on the other hand, the impregnation degree is higher than the aforesaid upper limit, the surface of the resin-impregnated substrate paper will be too sticky, which will stand in the way of further processing of the materials. In addition to that the present inventors have found that if the impregnation degree is too high, resin will remain behind on the surface of the paper, resulting in a non-uniform gloss level of the resin-impregnated paper. Too high an impregnation degree will also form a barrier for the ink composition to be applied in step ii), which ink composition can thus penetrate insufficiently into the resin-impregnated substrate paper. In a special embodiment it is thus desirable to select the resin-impregnated substrate paper used in step i) so that a slightly mat appearance is obtained, with the top layer of the substrate paper thus impregnated with a resin exhibiting a slight degree of porosity, which porosity is desirable in view of the ink composition to be applied in step ii).

It is in particular desirable that the resin-impregnated substrate paper exhibit a residual moisture content in the 0.1-9% range, based on the dry weight of the substrate paper, before step ii) is carried out. The present inventors assume that stickiness problems of the paper thus impregnated with a resin may occur in the case of a residual moisture content higher than the aforesaid upper limit, as a result of which such paper will be difficult to handle for further processing.

The substrate paper thus obtained in step i) is directly suitable for being subjected to step ii). In a preferred embodiment of the present invention, the surface of the substrate paper is free from colouring mass, in particular free from colouring mass having titanium dioxide, barium sulphate and silicate as its main components, before step ii) is carried out. The substrate paper, in particular the surface of the substrate paper, is in particular free from colouring mass having an average particle diameter in the nanometer range. The substrate paper being subjected to step ii) is provided with resin over the entire thickness thereof, i.e. resin components are also present at the substrate surface.

According to the present invention, the substrate paper is printed with an ink composition, using inkjet technology, in step ii), which operation is characterised in that the substrate paper is provided with the ink composition at discrete positions, using inkjet technology, in step ii), with the ink composition thus applied partially migrating into the resin-impregnated substrate paper.

The ink composition used in step ii) is in particular selected from the group of radiation-curable inks, water-based and solvent-based inks, or a combination thereof, with the aforesaid ink composition in particular comprising pigments.

From the viewpoint of weather resistance, in particular in the case of outdoor use, it is desirable that some of the pigments present in the ink composition be of the inorganic type, in particular selected from the group of yellow, red and magenta pigments, preferably from the group of iron oxides, chromium oxides, vanadates and titanates.

The resin composition used in step i) is preferably a water-based emulsion or dispersion comprising actinic radiation-curable binders, which binders comprise both (meth)acrylate and urethane groups, in particular UV radiation- or electron beam (EB)-curable binders. The presence of water is in particular desirable in order to realise a satisfactory impregnation of the resin in the paper. The resin composition used in step i) is, in particular, not a melamine resin.

The amount of resin and the manner of impregnation are such that the paper is impregnated with resin over the entire thickness thereof, in contrast to the manner of impregnation in the above-discussed German Offenlegungsschrift 10 2008 008 292, in which impregnation over the entire thickness of the paper is not allowed.

To obtain a durable bond between the individual layers in the final decorative film it is desirable that still reactive groups be present in the resin-impregnated substrate paper before step iv) is carried out. Such a situation will have advantageous results in particular if the final curing step according to step v) is carried out, wherein the individual layers are durably bonded together through chemical reaction mechanisms.

Thus it is desirable that the curing treatment of step iii) be carried out in such a manner that incomplete curing of the ink composition applied in step ii) will result if a radiation-curable ink composition is used, in particular that at least 5% of the reactive groups of the ink composition applied in step ii) will remain uncured.

The top layer to be applied in step iv) is applied in such a manner that said top layer will partially migrate into the resin-impregnated substrate paper, in particular that the layer thickness of the top layer ranges between 30 and 300 $g/m^2$, measured as the layer thickness on top of the resin-impregnated substrate paper. A layer thickness near the aforesaid upper limit will lead to improved weather resistance.

Although mention has been made of a top layer in the foregoing, the top layer may consist of one or more sublayers in certain embodiments, which sublayers may have different properties. It is possible, therefore, to incorporate individual components in the sublayers, so that a certain functionalisation of the top layer consisting of one or more sublayers will thus take place. Thus it is possible for the sublayer that has been applied directly to the resin-impregnated substrate paper to have a viscosity of less than 10,000 mPas, preferably less than 1000 mPas.

Preferably, the top layer comprises one or more components selected from the group of HALS, UV stabilisers, UV absorbents, weather resistance agents, viscosity-control agents, reactive diluents and antioxidants, preferably in combination with binders comprising (meth)acrylate or urethane groups, or combinations thereof, as suitable components for the functionalisation of the top layer, which top layer may consist of one or more sublayers.

A suitable resin as used in step i) for providing the resin-impregnated substrate paper is preferably a resin which comprises thermally curable and/or actinic radiation-curable groups or a combination thereof, wherein the amount of polycondensation resins, in particular ureum- and/or melamine-based aminoplast resins, is at most 50 wt. %, preferably at most 20 wt. %, more in particular at most 10 wt. %, based on the weight of the mixture of polycondensation resins and actinic radiation-curable and thermally curable resins. In a preferred embodiment, the resin-impregnated substrate paper as used in step i) does not comprise melamine resin.

To make curing through UV radiation possible, the resin-impregnated substrate paper used in step i) preferably comprises UV initiators.

Actinic radiation treatment and/or thermal treatment may be used as the curing treatment of step v). In a preferred embodiment of the present invention only an actinic radiation treatment is used as the curing treatment of step v).

Using the present method, the present inventors have found it possible to produce a decorative film which is characterised by an adhesion between the top layer, the ink composition and the resin-impregnated substrate paper of a class of less than or equal to 2, measured in accordance with ISO/DIN 2409.

The present invention further relates to a method for manufacturing a decorative panel, wherein an intermediate layer may be placed between a carrier material and the decorative film, after which the whole is pressed together at a temperature of 100-250° C. and a pressure of 10-100 bar for 1-30 minutes. Said pressing together enables the resin of the carrier material, if present, to penetrate into the decorative film, as a result of which a region in which the resin of the carrier material and the resin of the decorative film flow together can be discerned in the decorative films.

The present invention further relates to a method for manufacturing a decorative panel, wherein a carrier material is durably bonded to the decorative film obtained after step v), wherein the carrier material is selected from the group of HPL (high-pressure laminates), chipboard, MDF (medium density fibreboard), concrete panels, aluminium panels, composite panels and steel panels.

One embodiment for manufacturing the aforesaid decorative panel comprises, in a first step thereof, durably bonding the substrate paper, which is not impregnated yet, to the carrier material. Following that, the substrate paper thus present on the carrier material is subjected to an impregnation treatment, with the resin penetrating into the substrate paper, thereby obtaining an assembly comprising resin-impregnated paper bonded to carrier materials, which assembly can subsequently be subjected to step ii) of the present invention.

According to another embodiment of the present invention, a durable bond to one or more of the aforesaid carrier materials is effected after step i), in which a resin-impregnated substrate paper is obtained, after which the assembly thus obtained, which comprises a resin-impregnated substrate paper which is durably bonded to carrier material, is subjected to step iii).

The present invention further relates to a decorative panel, comprising a carrier and a decorative film applied to the carrier, wherein the decorative panel is characterised by a resistance against weather influences, measured in accordance with EN438-2:29, of a class higher than 4, and a grey scale, measured in accordance with ISO 105-AO2, of at least 4. According to the present invention, said decorative panel is further characterised in that the bond in the layers present in the decorative film on the one hand and the bond between the decorative film and the carrier on the other hand, measured in accordance with DIN 52366, is at least 2 $N/mm^2$ at all times.

Suitable substrate papers are so-called base papers for impregnation, defined in accordance with DIN6730:2000-06, having values of 30 $g/m^2$-200 $g/m^2$, in particular 60 $g/m^2$-90 $g/m^2$.

Resins that result in a good weather resistance, in particular emulsions or dispersions that contain radiation-curable groups, thermally curable groups or both types of groups, can be used as impregnation resins.

Suitable ink types for the inkjet technology are inks that are stable at high temperatures, in particular ink compositions that are light-resistant.

The step of curing the ink composition must preferably be carried out so that the ink takes on a somewhat solid state but is not fully cured yet, which means that reactive groups will still be present in the situation in which radiation-curable ink compositions are used. In the case of water-based and solvent-based ink compositions, a transition from liquid state to a somewhat solid state is obtained by removing the water phase and the solvent phase, respectively, for example by drying or evaporating.

If the top layer consists of one or more sublayers, it is preferable if the outer sublayer contains components that protect the underlying ink layer, for example UV absorbents and HALS. Furthermore it is desirable that yellowing, decolouration and/or degradation be prevented.

The present invention will now be explained by means of a number of examples, in which regard it should be noted, however, that the present invention is by no means limited to such special examples.

Examples 1-33

A number of decorative films were produced according to the composition and the process conditions shown in the table. In Example 1 a so-called base paper having a weight of 80 g/m² was thus used as the substrate paper. The substrate paper was impregnated, using Bayhydrol UV LS2348 as the resin, in an amount of 40%. After impregnation, a resin-impregnated substrate paper having a residual moisture content of 1.50% was obtained, which substrate paper was printed with a type Durst Rho Roll type of ink (marketed by Durst), using inkjet technology. Subsequently, UV radiation was carried out, producing a sticky free result. A composition of type Desmolux U680H 80%, HDDA 17% and Tinuvin 5152 3% was applied as the top layer. The thickness of the top layer thus applied was 90 g/m². The assembly of substrate paper, ink jet layer and top layer was subjected to two curing steps, viz. a first treatment with a 15 kGray electron beam and a second treatment, to be described as post-curing, with a 40 kGray electron beam.

The decorative film thus obtained scored well on a number of criteria, viz. adhesion, weather resistance, delamination. In addition, the intermediate products obtained during production were also evaluated on a number of points, in particular visual impression and stickiness.

The operations as discussed for Example 1 were repeated, with this difference that the compositions and/or process conditions shown in the Table were used.

From the Table it follows that Examples 14-18, 20, 30 and 33 provide unsatisfactory results as regards the properties of the required product, or score insufficiently as regards the intermediate products. For Example 14 an impregnation amount of 5% in the substrate paper was used, resulting in poor weather resistance and adhesion properties. If an impregnation amount of 80% in the substrate paper is used, as in Example 15, poor weather resistance and adhesion properties are obtained, but in addition, the intermediate products exhibit glossy spots and an undesirably high stickiness. In Example 16 a special selection of the type of resin, the amount of resin and the manner of fabrication of the substrate paper was used, resulting in a deteriorating weather resistance and adhesion properties. In Example 17 a curing treatment was first carried out after resin impregnation of the substrate paper, after which printing, using inkjet technology, took place. The weather resistance and adhesion results were poor; the present inventors assume that such pre-curing results in a significant decrease of the porosity of the resin-impregnated substrate paper, as a result of which the ink to be applied by means of inkjet technology can insufficiently penetrate into the substrate and a large part of the reactive groups are lost. In Example 18 the substrate paper (not resinated yet) was glued onto a panel, after which the required impregnation treatment was carried out. Although the panels thus obtained could be stacked, the weather resistance and adhesion problems were unsatisfactory. If the impregnation resin was exchanged for a type YY resin, as used Example 20, this resulted in undesirably poor weather resistance and adhesion properties. In Example 30 full curing took place after the application of the ink composition, resulting in unsatisfactory weather resistance properties. In Example 33 additives for enhancing the weather resistance are lacking, as a result of which the weather resistance properties are somewhat unsatisfactory.

| | 1 | 2 | 3 | 4 | 5 | 6 | 7 | 8 |
|---|---|---|---|---|---|---|---|---|
| | | | Experiments | | | | | |
| substrate paper | base paper for impregnation with synthetic resins as defined in DIN6730: 2000-06 | print grade base paper for impregnation with synthetic resins as defined in DIN6730: 2000-06 | paper of synthetic designed for impregnation with synthetic resins | overlay paper | edge banding paper | base paper for impregnation with synthetic resins as defined in DIN6730: 2000-06 | base paper for impregnation with synthetic resins as defined in DIN6730: 2000-06 | base paper for impregnation with synthetic resins as defined in DIN6730: 2000-06 |
| substrate paper colour | white, 30% ash | white, 30% ash | white, 45% ash | transparent | white | beige, 24% ash | white, 30% ash | white, 30% ash |
| substrate paper weight | 80 g/m2 | 80 g/m2 | 140 g/2 | 80 g/m2 | 200 g/m2 | 80 g/m2 | 80 g/m2 | 80 g/m2 |
| impregnation resin | bayhydrol UV LS2348 | bayhydrol UV LS2348 | bayhydrol UV LS2348 | bayhydrol UV LS2348 | bayhydrol UV LS2348 | bayhydrol UV LS2348 | 99% bayhydrol UV LS2348 + 1% BAPO fotoinitiator | 95% bayhydrol UV LS2348 + 5% iso-cyanates |
| impregnation resin content | 40% based on paper weight | 40% based on paper weight | 40% based on paper weight | 70% based on paper weight | 40% based on paper weight | 40% based on paper weight | 40% based on paper weight | 40% based on paper weight |

-continued

| | | | | | | | | |
|---|---|---|---|---|---|---|---|---|
| moisture content | 1.50% | 1.50% | 1.50% | 1.50% | 1.50% | 1.50% | 1.50% | 1.50% |
| curing of impregnation resin before printing | — | — | — | — | — | — | — | — |
| combining with carrier material before printing | — | — | — | — | — | — | — | — |
| ink set | Durst Rho | Durst Rho | Durst Rho | Durst Rho | Durst Rho | Durst Rho | Durst Rho | Durst Rho |
| ink curing | Roll ink solidified partially cured with UV, tack free | Roll ink solidified partially cured with UV, tack free | Roll ink solidified partially cured with UV, tack free | Roll ink solidified partially cured with UV, tack free | Roll ink solidified partially cured with UV, tack free | Roll ink solidified partially cured with UV, tack free | Roll ink solidified partially cured with UV, tack free | Roll ink solidified partially cured with UV, tack free |
| protective coating | Desmolux U680H 80%/ HDDA 17%/ Tinuvin 5152 3% | Desmolux U680H 80%/ HDDA 17%/ Tinuvin 5152 3% | Desmolux U680H 80%/ HDDA 17%/ Tinuvin 5152 3% | Desmolux U680H 80%/ HDDA 17%/ Tinuvin 5152 3% | Desmolux U680H 80%/ HDDA 17%/ Tinuvin 5152 3% | Desmolux U680H 80%/ HDDA 17%/ Tinuvin 5152 3% | Desmolux U680H 79%/ HDDA 17%/ Tinuvin 5152 3% BAPO/1% | Desmolux U680H 80%/ HDDA 17%/ Tinuvin 5152 3% |
| intermediate layer | — | — | — | — | — | — | — | — |
| thickness protective coating | 90 g/m2 | 90 g/m2 | 90 g/m2 | 90 g/m2 | 90 g/m2 | 90 g/m2 | 90 g/m2 | 90 g/m2 |
| pre-curing of protective coating | EB 15 kGray | EB 15 kGray | EB 15 kGray | EB 15 kGray | EB 15 kGray | EB 15 kGray | UV-full cure from both sides | EB 15 kGray |
| post curing of decorative film | EB 40 kGray | EB 40 kGray | EB 40 kGray | EB 40 kGray | EB 40 kGray | EB 40 kGray | | EB 40 kGray |
| Results | | | | | | | | |
| looks impregnated paper before printing | uniform matt | uniform matt | uniform matt | uniform matt | uniform matt | uniform matt | uniform matt | uniform matt |
| unwinding impregnated paper before printing | no sticking | no sticking | no sticking | no sticking | no sticking | no sticking | no sticking | no sticking |
| visual appearance printed decorative film | good | good | good | good | good | good | good | good |
| adhesion of protective coating to ink and substrate: tape test | good | good | good | good | good | good | good | good |
| adhesion of ink to impregnated paper to decorative film: crosshatch | good | good | good | good | good | good | good | good |
| peelability to DIN6730: 2000-06 | good | good | good | good | good | good | good | good |
| weatherability according to EN438 | good | good | good | good | good | good | good | good |
| weatherability, more severe conditions | moderate | moderate | moderate | moderate | moderate | moderate | moderate | moderate |

| | 9 | 10 | 11 | 12 | 13 | 14 | 15 |
|---|---|---|---|---|---|---|---|
| Experiments | | | | | | | |
| substrate paper | base paper for impreg- | base paper for impreg- | base paper for impreg- | base paper for impreg- | base paper for impreg- | base paper for impreg- | base paper for impreg- |

-continued

|  |  |  |  |  |  |  |  |
|---|---|---|---|---|---|---|---|
|  | nation with synthetic resins as defined in DIN6730: 2000-06 | nation with synthetic resins as defined in DIN6730: 2000-06 | nation with synthetic resins as defined in DIN6730: 2000-06 | nation with synthetic resins as defined in DIN6730: 2000-06 | nation with synthetic resins as defined in DIN6730: 2000-06 | nation with synthetic resins as defined in DIN6730: 2000-06 | nation with synthetic resins as defined in DIN6730: 2000-06 |
| substrate paper colour | white, 30% ash | white, 30% ash | white, 30% ash | white, 30% ash | white, 30% ash | white, 30% ash | white, 30% ash |
| substrate paper weight | 80 g/m2 | 80 g/m2 | 80 g/m2 | 80 g/m2 | 80 g/m2 | 80 g/m2 | 80 g/m2 |
| impregnation resin | 97% bayhydrol UV LS2348 + 1% BAPO photo-initiator | bayhydrol UV LS2348 | bayhydrol UV LS2348 | bayhydrol UV LS2348 | bayhydrol UV LS2348 | bayhydrol UV LS2348 | bayhydrol UV LS2348 |
| impregnation resin content | 40% based on paper weight | 40% based on paper weight | 40% based on paper weight, impregnation from topside | 40% based on paper weight | 40% based on paper weight | 5% based on paper weight | 80% based on paper weight |
| moisture content | 1.50% | 1.50% | 1.50% | 1.50% | 1.50% | 1.50% | 1.50% |
| curing of impregnation resin before printing | substrated cured with UV before printing | — | — | — | — | — | — |
| combining with carrier material before printing | — | substrate glued upon panel before printing | substrate glued upon panel before impregnation | — | — | — | — |
| ink set | Durst Rho Roll ink | Durst Rho Roll ink | Durst Rho Roll ink | Dicojet HPL pigment ink | Chimigraf Spicy solvent ink | Durst Rho Roll ink | Durst Rho Roll ink |
| ink curing | solidified partially cured with UV, tack free | solidified partially cured with UV, tack free | solidified partially cured with UV, tack free | full drying | full drying | solidified partially cured with UV, tack free | solidified partially cured with UV, tack free |
| protective coating | Desmolux U680H 80%/ HDDA 17%/ Tinuvin 5152 3% | Desmolux U680H 80%/ HDDA 17%/ Tinuvin 5152 3% | Desmolux U680H 80%/ HDDA 17%/ Tinuvin 5152 3% | Desmolux U680H 80%/ HDDA 17%/ Tinuvin 5152 3% | Desmolux U680H 80%/ HDDA 17%/ Tinuvin 5152 3% | Desmolux U680H 80%/ HDDA 17%/ Tinuvin 5152 3% | Desmolux U680H 80%/ HDDA 17%/ Tinuvin 5152 3% |
| intermediate layer | — | — | — | — | — | — | — |
| thickness protective coating | 90 g/m2 | 90 g/m2 | 90 g/m2 | 90 g/m2 | 90 g/m2 | 90 g/m2 | 90 g/m2 |
| pre-curing of protective coating | EB 15 kGray | EB 15 kGray | EB 15 kGray | EB 15 kGray | EB 15 kGray | EB 15 kGray | EB 15 kGray |
| post curing of decorative film | EB 40 kGray | EB 40 kGray | EB 40 kGray | EB 40 kGray | EB 40 kGray | EB 40 kGray | EB 40 kGray |
| Results |  |  |  |  |  |  |  |
| looks impregnated paper before printing | uniform matt | uniform matt | uniform matt | uniform matt | uniform matt | uniform matt | gloss spots |
| unwinding impregnated paper before printing | no sticking | panels can be stacked before printing | panels can be stacked before printing | no sticking | no sticking | no sticking | sticking blocking |
| visual appearance printed decorative film | good | good | good | good | good | weak | good |
| adhesion of protective | good | good | good | good | good | good | weak |

-continued

| | | | | | | | | | |
|---|---|---|---|---|---|---|---|---|---|
| coating to ink and substrate: tape test adhesion of ink to impregnated paper to decorative film: | good | good | good | good | good | good | weak | | |
| crosshatch peelability to DIN6730: 2000-06 | good | good | good | good | good | weak | good | | |
| weatherability according to EN438 | good | good | good | good | good | weak | weak | | |
| weatherability, more severe conditions | moderate | moderate | moderate | moderate | moderate | weak | weak | | |

| | 16 | 17 | 18 | 19 | 20 | 21 | 22 | 23 | 24 | 25 |
|---|---|---|---|---|---|---|---|---|---|---|
| | | | | Experiments | | | | | | |
| substrate paper | preimpregnated paper | base paper for impregnation with synthetic resins as defined in DIN6730: 2000-06 | base paper for impregnation with synthetic resins as defined in DIN6730: 2000-06 | base paper for impregnation with synthetic resins as defined in DIN6730: 2000-06 | base paper for impregnation with synthetic resins as defined in DIN6730: 2000-06 | base paper for impregnation with synthetic resins as defined in DIN6730: 2000-06 | base paper for impregnation with synthetic resins as defined in DIN6730: 2000-06 | base paper for impregnation with synthetic resins as defined in DIN6730: 2000-06 | base paper for impregnation with synthetic resins as defined in DIN6730: 2000-06 | base paper for impregnation with synthetic resins as defined in DIN6730: 2000-06 |
| substrate paper colour | white | white, 30% ash | white, 30% ash | white, 30% ash | white, 30% ash | white, 30% ash | white, 30% ash | white, 30% ash | white, 30% ash | white, 30% ash |
| substrate paper weight | 100 g/m2 | 80 g/m2 | 80 g/m2 | 80 g/m2 | 80 g/m2 | 80 g/m2 | 80 g/m2 | 80 g/m2 | 80 g/m2 | 80 g/m2 |
| impregnation resin | | bayhydrol UV LS2348 | bayhydrol UV LS2348 | bayhydrol BL 5335/ bayhydrol U XP 2239 in stoichiometric mixture | Madurit MW 550 with catalyst | bayhydrol UV LS2348 | bayhydrol UV LS2348 | bayhydrol UV LS2348 | bayhydrol UV LS2348 | bayhydrol UV LS2348 |
| impregnation resin content | | 40% based on paper weight | 40% based on paper weight impregnation from topside | 40% based on paper weight | 40% based on paper weight | 40% based on paper weight | 40% based on paper weight | 40% based on paper weight | 40% based on paper weight | 40% based on paper weight |
| moisture content | 4.00% | 1.50% | 1.50% | 1.50% | 1.50% | 1.50% | 1.50% | 1.50% | 1.50% | 1.50% |
| curing of impregnation resin before printing | — | substrate cure with 15 kGy EB | — | — | — | — | — | — | — | — |
| combining with carrier material before printing | | — | substrate given upon panel before impregnation, glue prevents good impregnation | — | — | — | — | — | — | — |
| ink set | Durst Rho Roll ink | Durst Rho Roll ink | Durst Rho Roll ink | Durst Rho Roll ink | Durst Rho Roll ink | Durst Rho Roll ink | Durst Rho Roll ink | Durst Rho Roll ink | Durst Rho Roll ink | Durst Rho Roll ink |
| ink curing | solidified partially cured | solidified partially cured | solidified partially cured | solidified partially cured | solidified partially cured | solidified partially cured | solidified partially cured | solidified partially cured | solidified partially cured | solidified partially cured |

-continued

| | | | | | | | | | | |
|---|---|---|---|---|---|---|---|---|---|---|
| protective coating | with UV, tack free Desmolux U680H 80%/ HDDA 17%/ Tinuvin 5152 3% | with UV, tack free Desmolux U680H 80%/ HDDA 17%/ Tinuvin 5152 3% | with UV, tack free Desmolux U680H 80%/ HDDA 17%/ Tinuvin 5152 3% | with UV, tack free Desmolux U680H 80%/ HDDA 17%/ Tinuvin 5152 3% | with UV, tack free Desmolux U680H 80%/ HDDA 17%/ Tinuvin 5152 3% | with UV, tack free Desmolux XP-2666 80%/ HDDA 17%/ Tinuvin 5152 3% | with UV, tack free Desmolux XP-2666 79%/ HDDA 17%/ Tinuvin 5152 3%/ Irgacure 184 1% | with UV, tack free Sartomer CN9001 80%/ HDDA 17%/ Tinuvin 5152 3% | with UV, tack free Desmodur N3600/ Desmo-phen 670 in stoichio-metric mixture | with UV, tack free Desmolux U680H 80%/ HDDA 17%/ Tinuvin 5152 3% |
| intermediate layer | — | — | — | — | — | — | — | — | — | — |
| thickness protective coating | 90 g/m2 | 90 g/m2 | 90 g/m2 | 90 g/m2 | 90 g/m2 | 90 g/m2 | 90 g/m2 | 90 g/m2 | 90 g/m2 | 90 g/m2 |
| pre-curing of protective coating | EB 15 kGray | EB 15 kGray | EB 15 kGray | EB 40 kGray | EB 15 kGray | EB 15 kGray | UV full cure | EB 15 kGray | thermal | EB 15 kGray |
| post curing of decorative film | EB 40 kGray | EB 40 kGray | EB 40 kGray | thermal cure | EB 40 kGray | EB 40 kGray | EB 40 kGray | EB 40 kGray | EB 40 kGray | EB 40 kGray |

Results

| | | | | | | | | | | |
|---|---|---|---|---|---|---|---|---|---|---|
| looks impregnated paper before printing | uniform matt | uniform matt | not uniform | uniform matt | uniform matt | uniform matt | uniform matt | uniform matt | uniform matt | uniform matt |
| unwinding impregnated paper before printing | no sticking | no sticking | panels can be stacked before printing | no sticking | no sticking | no sticking | no sticking | no sticking | no sticking | sticking blocking |
| visual appearance printed decorative film | weak | good | weak | good | weak | good | good | good | good | good |
| adhesion of protective coating to ink and substrate: tape test | weak | weak | weak | good | weak | good | good | good | good | good |
| adhesion of ink to impregnated paper to decorative film: crosshatch | good | weak | weak | good | weak | good | good | good | good | good |
| peelability to DIN6730: 2000-06 | weak | good | good | good | weak | good | good | good | good | good |
| weatherability according to EN438 | weak | moderate | weak | good | weak | good | good | good | good | good |
| weatherability, more severe conditions | weak | weak | weak | moderate | weak | moderate | moderate | moderate | moderate | moderate |

| | 26 | 27 | 28 | 29 | 30 | 31 | 32 | 33 |
|---|---|---|---|---|---|---|---|---|

Experiments

| | | | | | | | | | |
|---|---|---|---|---|---|---|---|---|---|
| | substrate paper | base paper for impregnation with synthetic resins as defined in DIN6730: 2000-06 | base paper for impregnation with synthetic resins as defined in DIN6730: 2000-06 | base paper for impregnation with synthetic resins as defined in DIN6730: 2000-06 | base paper for impregnation with synthetic resins as defined in DIN6730: 2000-06 | base paper for impregnation with synthetic resins as defined in DIN6730: 2000-06 | base paper for impregnation with synthetic resins as defined in DIN6730: 2000-06 | base paper for impregnation with synthetic resins as defined in DIN6730: 2000-06 | base paper for impregnation with synthetic resins as defined in DIN6730: 2000-06 |
| | substrate paper colour | white, 30% ash | white, 30% ash | white, 30% ash | white, 30% ash | white, 30% ash | white, 30% ash | white, 30% ash | white, 30% ash |
| | substrate paper weight | 80 g/m2 | 80 g/m2 | 80 g/m2 | 80 g/m2 | 80 g/m2 | 80 g/m2 | 80 g/m2 | 80 g/m2 |

-continued

| | | | | | | | | |
|---|---|---|---|---|---|---|---|---|
| impregnation resin | bayhydrol UV LS2348 | bayhydrol UV LS2348 | bayhydrol UV LS2348 | bayhydrol UV LS2348 | bayhydrol UV LS2348 | bayhydrol UV LS2348 | bayhydrol UV LS2348 | bayhydrol UV LS2348 |
| impregnation resin content | 40% based on paper weight | 40% based on paper weight | 40% based on paper weight | 40% based on paper weight | 40% based on paper weight | 40% based on paper weight | 40% based on paper weight | 40% based on paper weight |
| moisture content | 1.50% | 1.50% | 1.50% | 1.50% | 1.50% | 1.50% | 1.50% | 1.50% |
| curing of impregnation resin before printing | — | — | — | — | — | — | — | — |
| combining with carrier material before printing | — | — | — | — | — | — | — | — |
| ink set | AGFA test ink with inorganic pigmnets | AGFA test ink with inorganic pigments without photo-initiators | Durst Rho flexible ink | Durst Rho Roll ink | Durst Rho Roll ink | Durst Rho Roll ink | Durst Rho Roll ink | Durst Rho Roll ink |
| ink curing | solidified partially cured with UV, tack free | solidified partially cured by EB, tack free | solidified, partially cured with UV, tack free | full cured | solidified partially cured with UV, tack free | solidified partially cured with UV, tack free | solidified partially cured with UV, tack free | solidified partially cured with UV, tack free |
| protective coating | Desmolux U680H 80%/ HDDA 17%/ Tinuvin 5152 3% | Desmolux U680H 80%/ HDDA 17%/ Tinuvin 5152 3% | Desmolux U680H 80%/ HDDA 17%/ Tinuvin 5152 3% | Desmolux U680H 80%/ HDDA 17%/ Tinuvin 5152 3% | Desmolux U680H 80%/ HDDA 20% | Desmolux U680H 80%/ HDDA 17%/ Tinuvin 5152 3% | Desmolux U680H 80%/ HDDA 17%/ Tinuvin 5152 3% | Desmolux U680H 80%/ HDDA 17%/ Tinuvin 5152 3% |
| intermediate layer | — | — | — | — | — | 30 g/m2 Desmolux U680H 60%/ HDDA 37%/ Tinuvin 5152 3% | — | — |
| thickness protective coating | 90 g/m2 | 90 g/m2 | 90 g/m2 | 90 g/m2 | 90 g/m2 | 60 g/m2 | 90 g/m2 | 30 g/m2 |
| pre-curing of protective coating | EB 15 kGray | EB 15 kGray | EB 15 kGray | EB 15 kGray | EB 15 kGray | EB 15 kGray | EB 60 kGray | EB 15 kGray |
| post curing of decorative film | EB 40 kGray | EB 40 kGray | EB 40 kGray | EB 40 kGray | EB 40 kGray | EB 40 kGray | | EB 40 kGray |
| Results | | | | | | | | |
| looks impregnated paper before printing | uniform matt | uniform matt | uniform matt | uniform matt | uniform matt | uniform matt | uniform matt | uniform matt |
| unwinding impregnated paper before printing | no sticking | no sticking | no sticking | no sticking | no sticking | no sticking | no sticking | no sticking |
| visual appearence printed decorative film | good | good | good | good | good | good | good | good |
| adhesion of protective coating to ink and substrate: tape test | good | good | good | good | good | good | good | good |
| adhesion of ink to impreg-nated paper to decorative film: crosshatch peelability to DIN6730: 2000-06 | good | good | good | good | good | good | good | good |

| | | | | | | | | |
|---|---|---|---|---|---|---|---|---|
| weatherability according to EN438 | good | good | good | good | moderate | good | good | moderate |
| weatherability, more severe conditions | very good | very good | moderate | moderate | weak | moderate | moderate | weak |

The invention claimed is:

1. A method for producing a decorative film comprising a resin-impregnated substrate paper provided with one or more top layers, wherein the method comprises the following steps:
   i) providing a resin-impregnated substrate paper,
   ii) printing the substrate paper obtained in step i) with an ink composition, using an inkjet,
   iii) subjecting the substrate paper printed with an ink composition as obtained after step ii) to a treatment of drying and/or curing,
   iv) applying at least one transparent top layer to the paper obtained after step iii), and
   v) curing the paper obtained after step iv) to obtain the decorative film, and
   wherein step i) comprises the provision of substrate paper and the impregnation thereof with a resin, wherein the impregnation degree of the resin-impregnated substrate paper in step i) is 30-60%, based on the dry weight of the substrate paper, with the resin present in the substrate paper comprises reactive groups, wherein the resin extends over the entire thickness of the substrate paper.

2. The method according to claim 1 wherein the resin-impregnated substrate paper has a residual moisture content in the 0.1-9% range, based on the dry weight of the substrate paper, before step ii) is carried out.

3. The method according to claim 1 wherein the substrate paper is provided with the ink composition at discrete positions, using an inkjet, in step ii), with the ink composition thus applied partially migrating into the resin-impregnated substrate paper.

4. The method according to claim 1 wherein the ink composition in step ii) is selected from radiation-curable inks, water-based and solvent-based inks, or a combination thereof, with the ink composition comprising pigments.

5. The method according to claim 4, wherein a part of the pigments present in the ink composition are of the inorganic type, selected from yellow, red and magenta pigments, which are iron oxides, chromium oxides, vanadates or titanates.

6. The method according to claim 5, wherein the resin composition in step i) is a water-based emulsion or dispersion comprising actinic radiation-curable binders, which binders comprise both (meth)acrylate and urethane groups, which are ultraviolet radiation- or electron beam curable binders.

7. The method according to claim 1 wherein the curing and/or drying treatment of step iii) is carried out such that incomplete curing of the ink composition applied in step ii) will result if a radiation-curable ink composition is used.

8. The method according to claim 1 wherein reactive groups are present in the resin-impregnated substrate paper before step iv) is carried out.

9. The method according to claim 8, wherein at least 5% of the reactive groups of the ink composition applied in step ii) remain uncured.

10. The method according to claim 1 wherein the top layer applied in step iv) is applied in such a manner that said top layer partially migrates into the resin-impregnated substrate paper, and the layer thickness of the top layer ranges between 30 and 300 g/m$^2$, measured as the layer thickness on top of the resin-impregnated substrate paper.

11. The method according to claim 10, wherein the top layer comprises one or more sublayers, wherein the sublayer applied directly to the resin-impregnated substrate paper has a viscosity of less than 10,000 mPas.

12. The method according to claim 1 wherein the top layer comprises one or more components selected from the group of hindered amine light stabilizers, ultraviolet stabilizers, ultraviolet absorbents, weather resistance agents, viscosity-control agents, reactive diluents and antioxidants, in combination with binders comprising (meth)acrylate groups or urethane groups, or combinations thereof.

13. The method according to claim 1 wherein the resin used in step i) comprises a resin which comprises thermally curable and/or actinic radiation-curable groups or a combination thereof, wherein an amount of polycondensation resins, comprising urea and/or melamine-based aminoplast resins, is at most 50 wt. %, based on the weight of the mixture of polycondensation resins and actinic radiation-curable and thermally curable resins.

14. The method according to claim 13, wherein the resin-impregnated substrate paper in step i) comprises an ultraviolet radiation initiator allowing ultraviolet radiation curing of said resin.

15. The method according to claim 13 wherein the resin used in step i) comprises a resin which comprises thermally curable and/or actinic radiation-curable groups or a combination thereof, wherein the amount of polycondensation resins, comprising urea- and/or melamine-based aminoplast resins, is at most 10 wt. %, based on the weight of the mixture of polycondensation resins and actinic radiation-curable and thermally curable resins.

16. The method according to claim 1 wherein the curing carried out in step v) comprises actinic radiation treatment and/or thermal treatment.

17. A decorative film obtained by the method of claim 1, comprising adhesion between the top layer, the ink composition and the resin-impregnated substrate paper of a class of less than or equal to 2, measured in accordance with ISO/DIN 2409.

18. A method for manufacturing a decorative panel, comprising preparing the decorative film of claim 1, wherein a carrier material is durably bonded to the decorative film obtained after step v), wherein the carrier material is selected from high-pressure laminates, chipboard, medium density fiberboard, concrete panels, aluminum panels, composite panels and steel panels.

19. The method according to claim 18, wherein the carrier material is durably bonded to the substrate paper, after which the assembly thus obtained is subjected to an impregnation treatment so as to obtain the assembly of resin-impregnated substrate paper bonded to the carrier material that is used in step i).

20. The method according to claim 18, wherein the carrier material is durably bonded to the resin-impregnated substrate paper, after which the assembly thus obtained is subjected to step iii).

21. A decorative panel comprising a carrier and a decorative film obtained by the method as defined in claim 1 which is applied to said carrier, wherein the decorative panel has a resistance against weather influences, measured in accordance with EN438-2:29, of a class higher than 4, and a grey scale, measured in accordance with ISO 105-AO2, of at least 4.

22. The decorative panel according to claim 21, wherein the bond in the layers present in the decorative film and the bond between the decorative film and the carrier, measured in accordance with DIN 52366, is at least 2 N/mm$^2$.

\* \* \* \* \*